Figure 1:
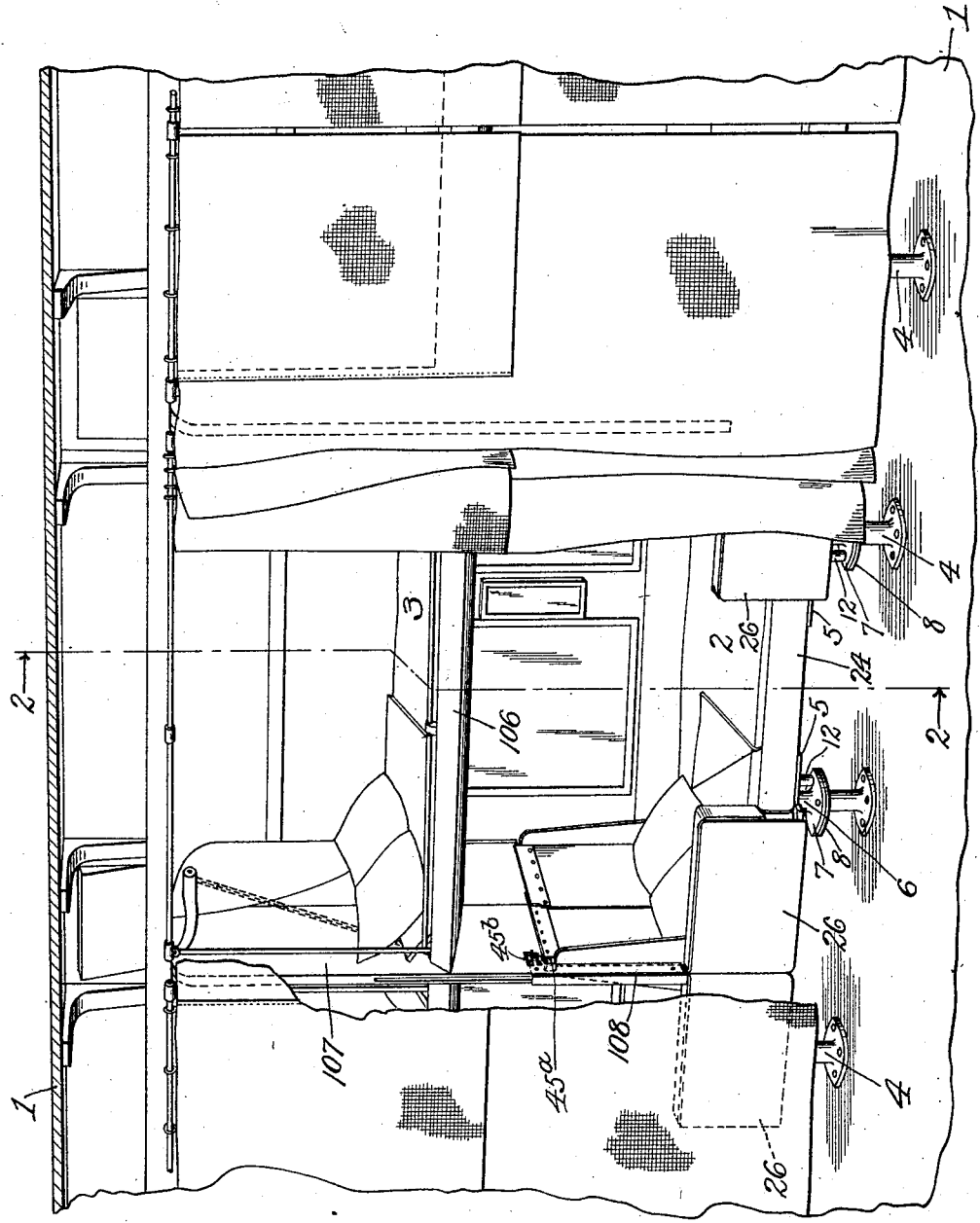

Sept. 20, 1932.  F. W. KOHLER  1,877,895
CHAIR CONSTRUCTION
Filed July 28, 1927  10 Sheets-Sheet 1

Inventor
Franklin W. Kohler
by Parker & Carter
Attorneys.

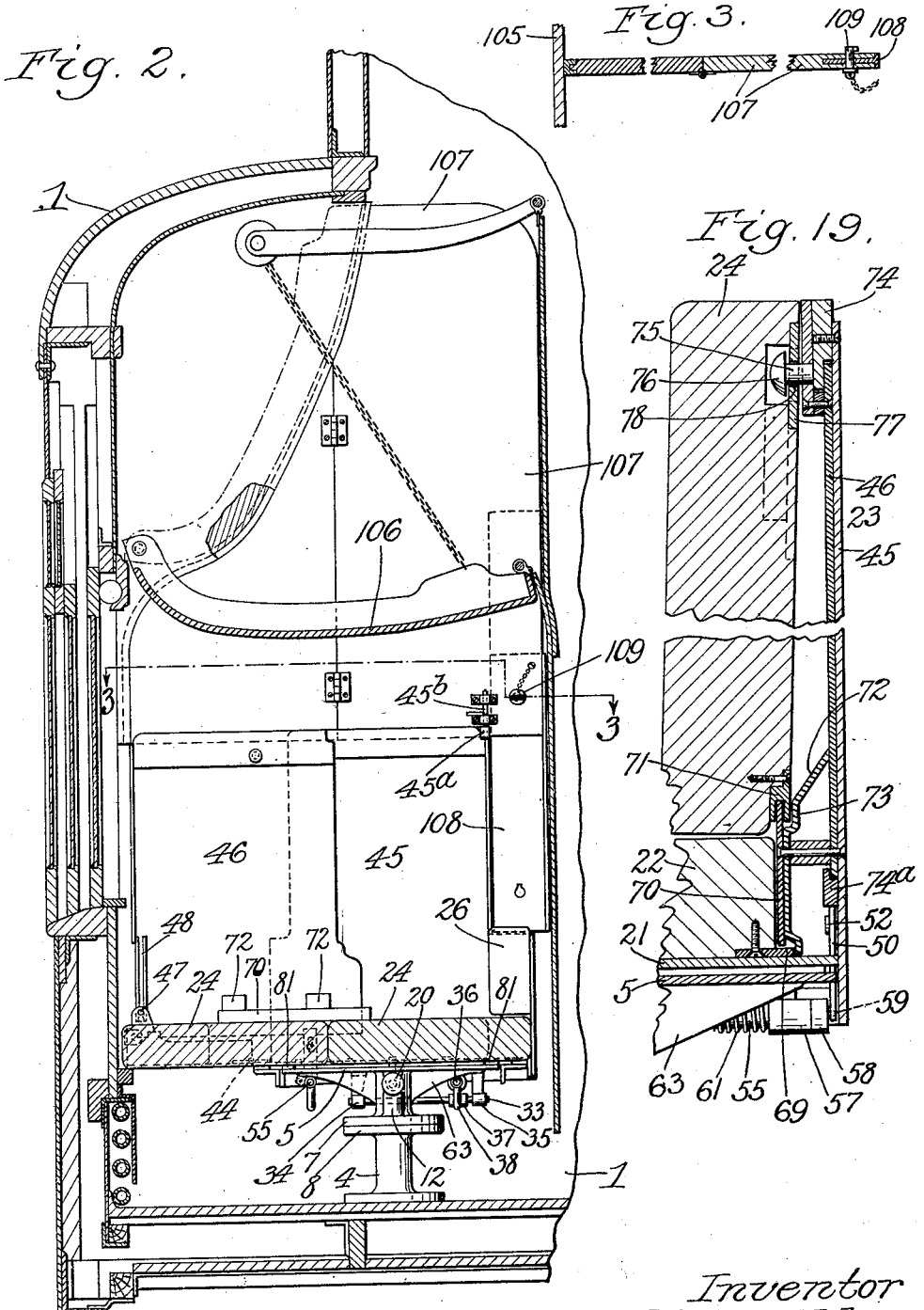

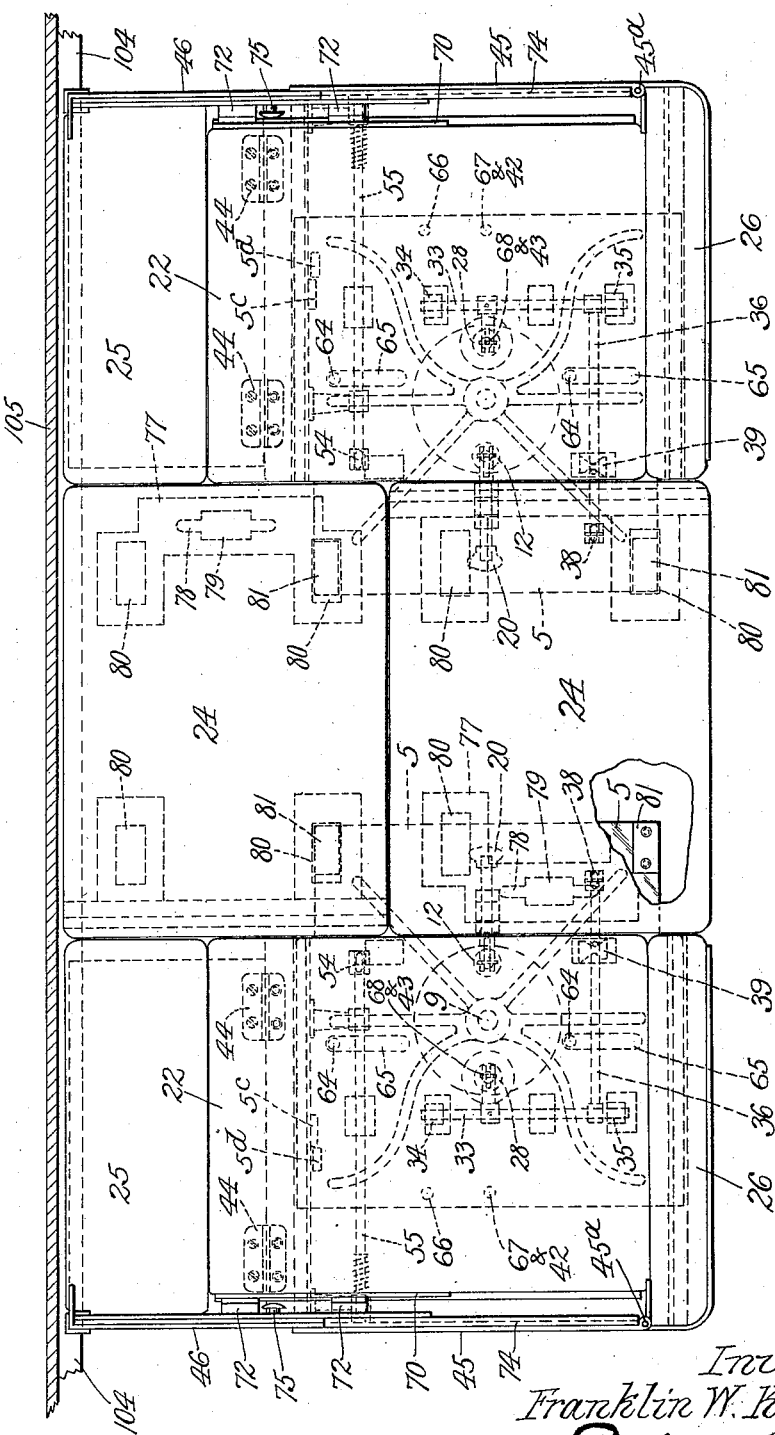

Sept. 20, 1932.  F. W. KOHLER  1,877,895
CHAIR CONSTRUCTION
Filed July 28, 1927  10 Sheets-Sheet 4
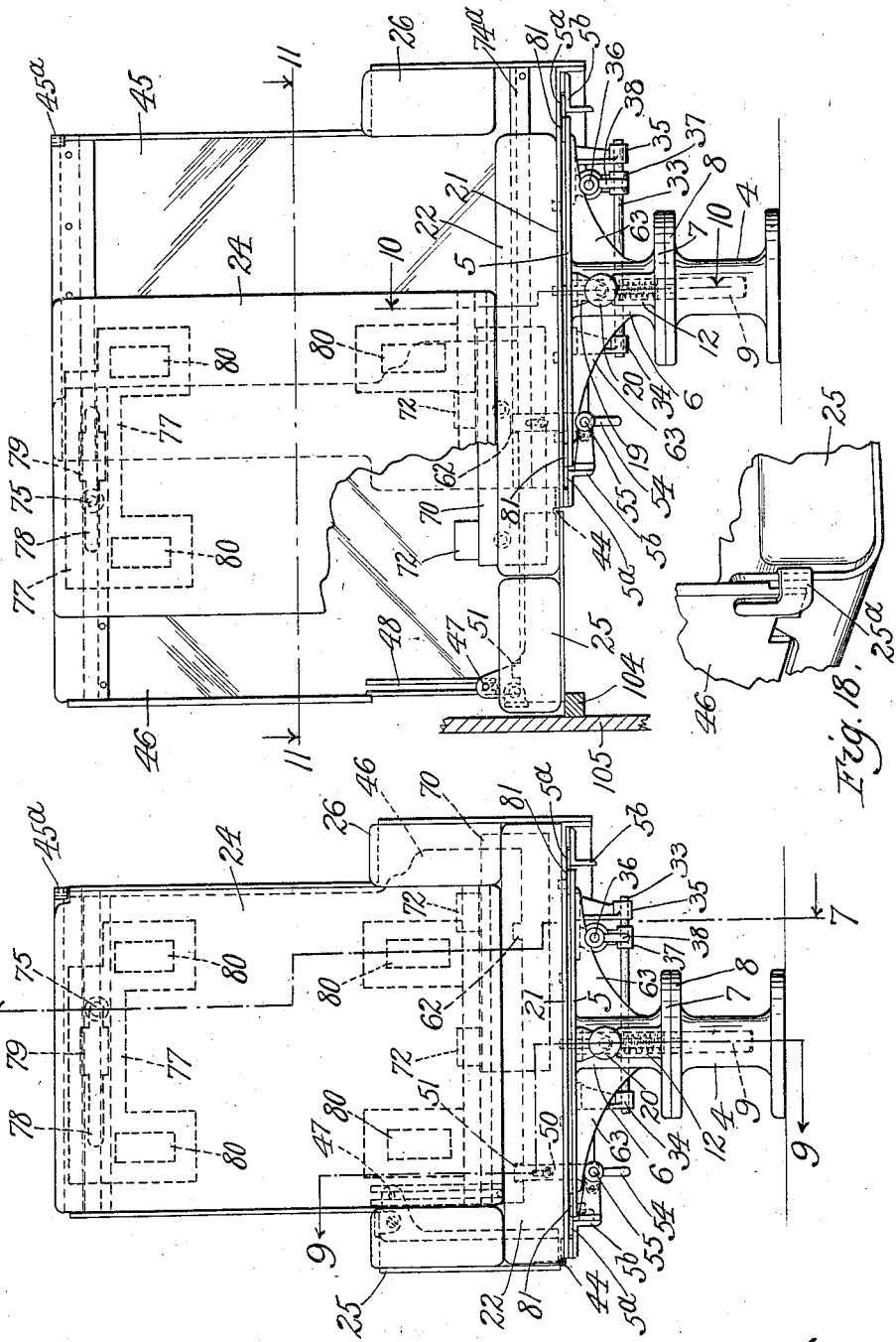
Inventor
Franklin W. Kohler
by Parker & Carter
Attorneys.

Sept. 20, 1932.  F. W. KOHLER  1,877,895
CHAIR CONSTRUCTION
Filed July 28, 1927   10 Sheets-Sheet 5
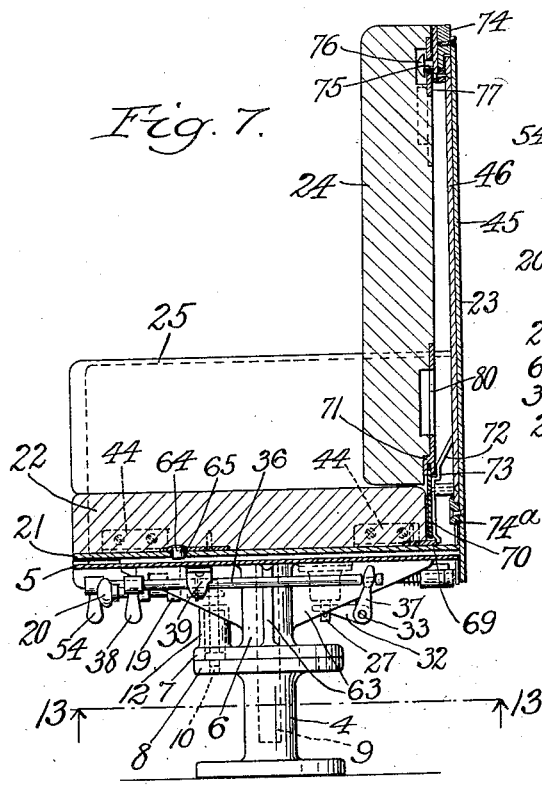
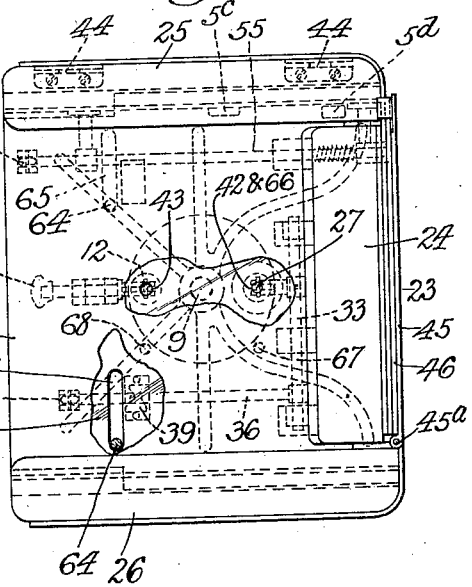
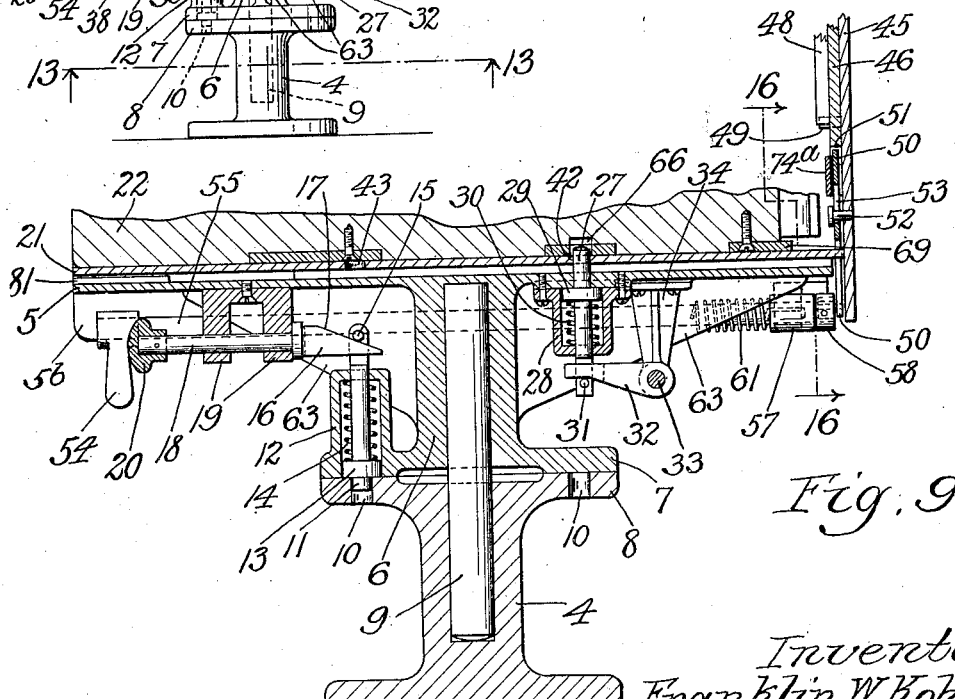
Inventor
Franklin W. Kohler
by Parker & Carter
Attorneys.

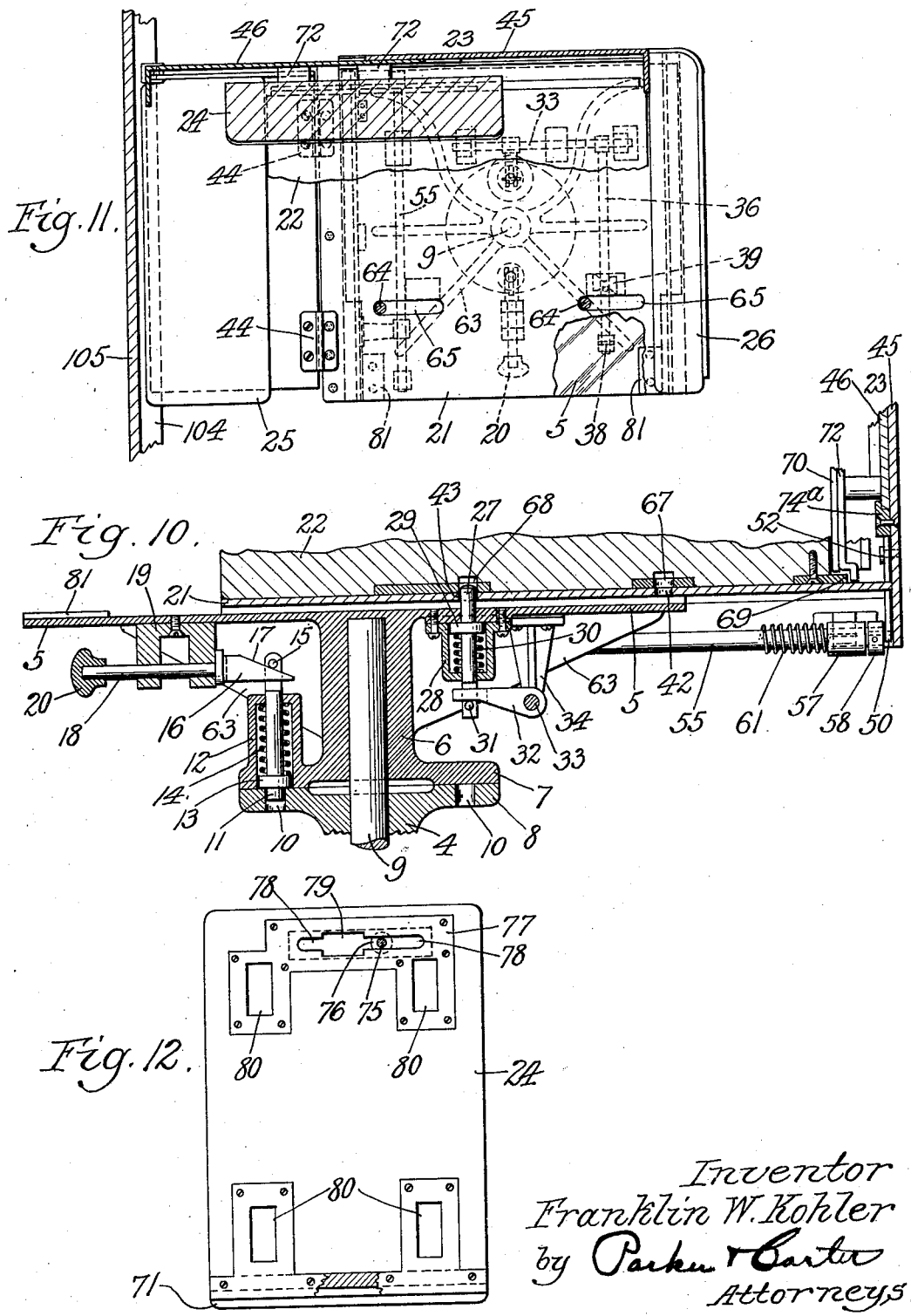

Sept. 20, 1932.   F. W. KOHLER   1,877,895
CHAIR CONSTRUCTION
Filed July 28, 1927   10 Sheets-Sheet 7
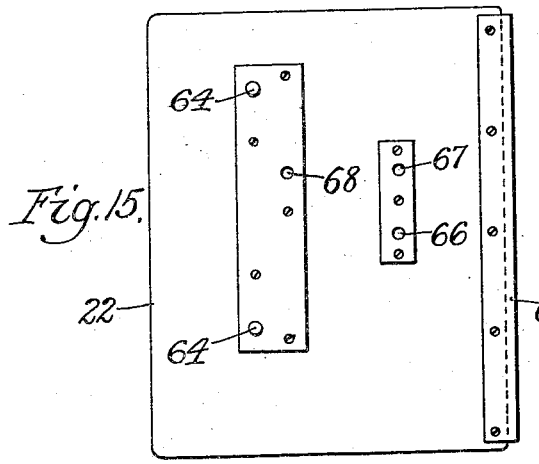
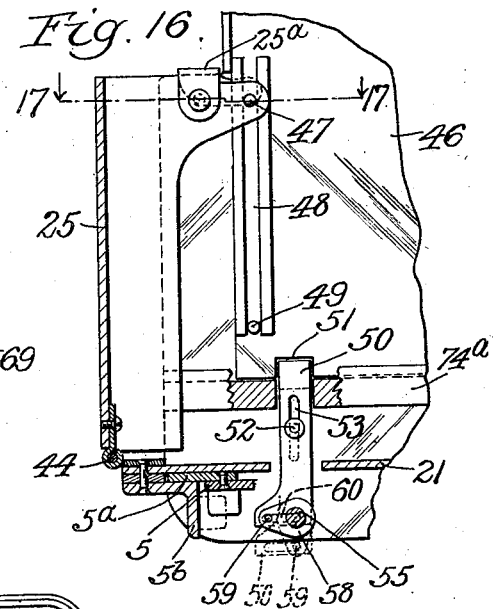
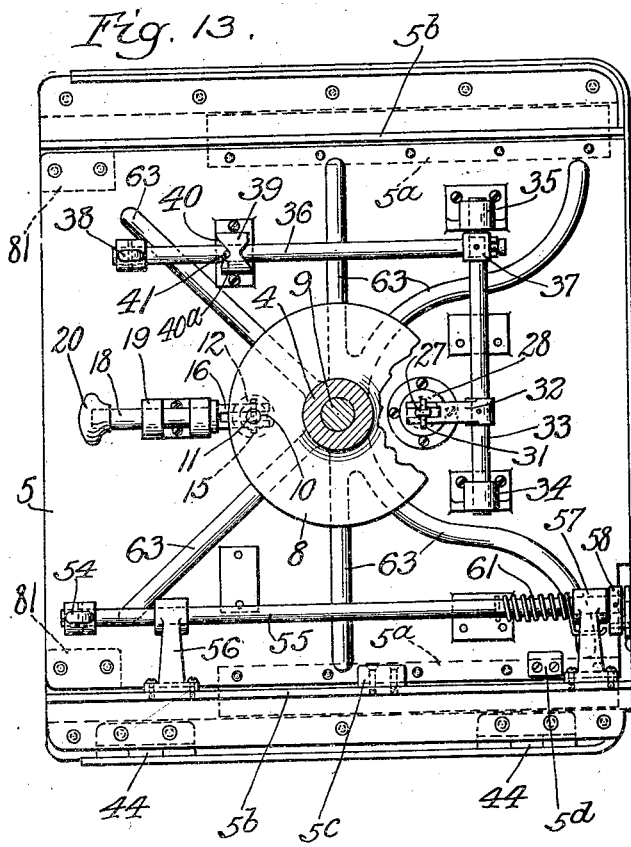
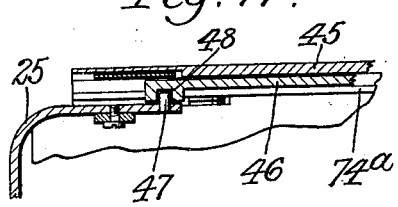
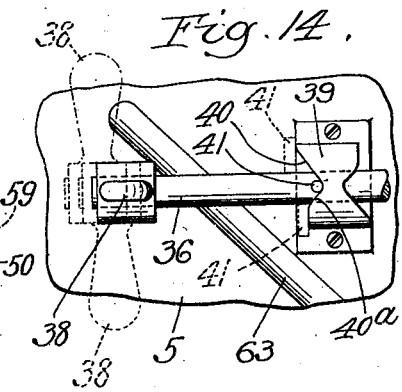
Inventor
Franklin W. Kohler
by Parker Carter
Attorneys.

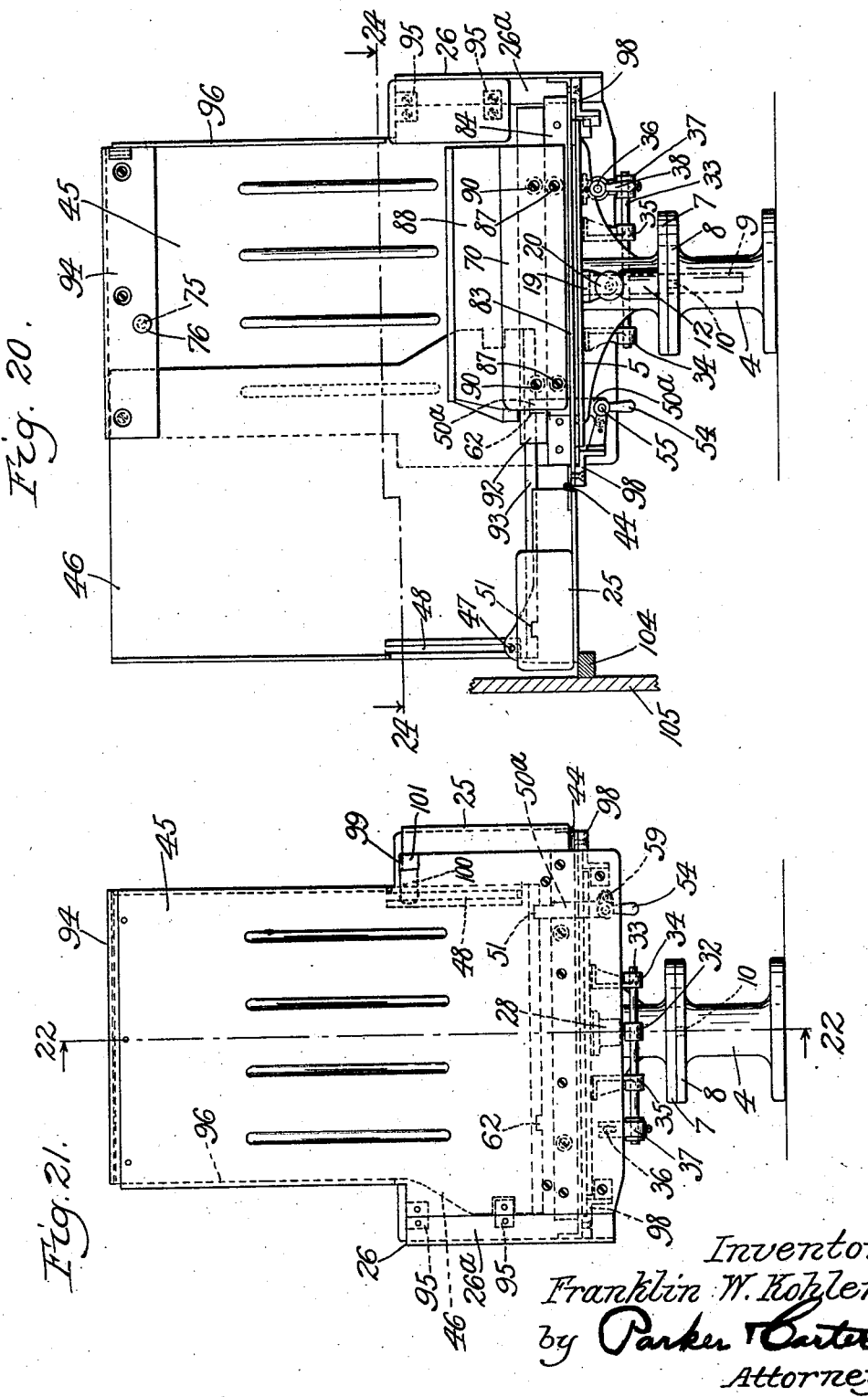

Sept. 20, 1932.  F. W. KOHLER  1,877,895
CHAIR CONSTRUCTION
Filed July 28, 1927   10 Sheets-Sheet 9

Inventor
Franklin W. Kohler
by Parker & Carter
Attorneys

Sept. 20, 1932.  F. W. KOHLER  1,877,895
CHAIR CONSTRUCTION
Filed July 28, 1927   10 Sheets-Sheet 10
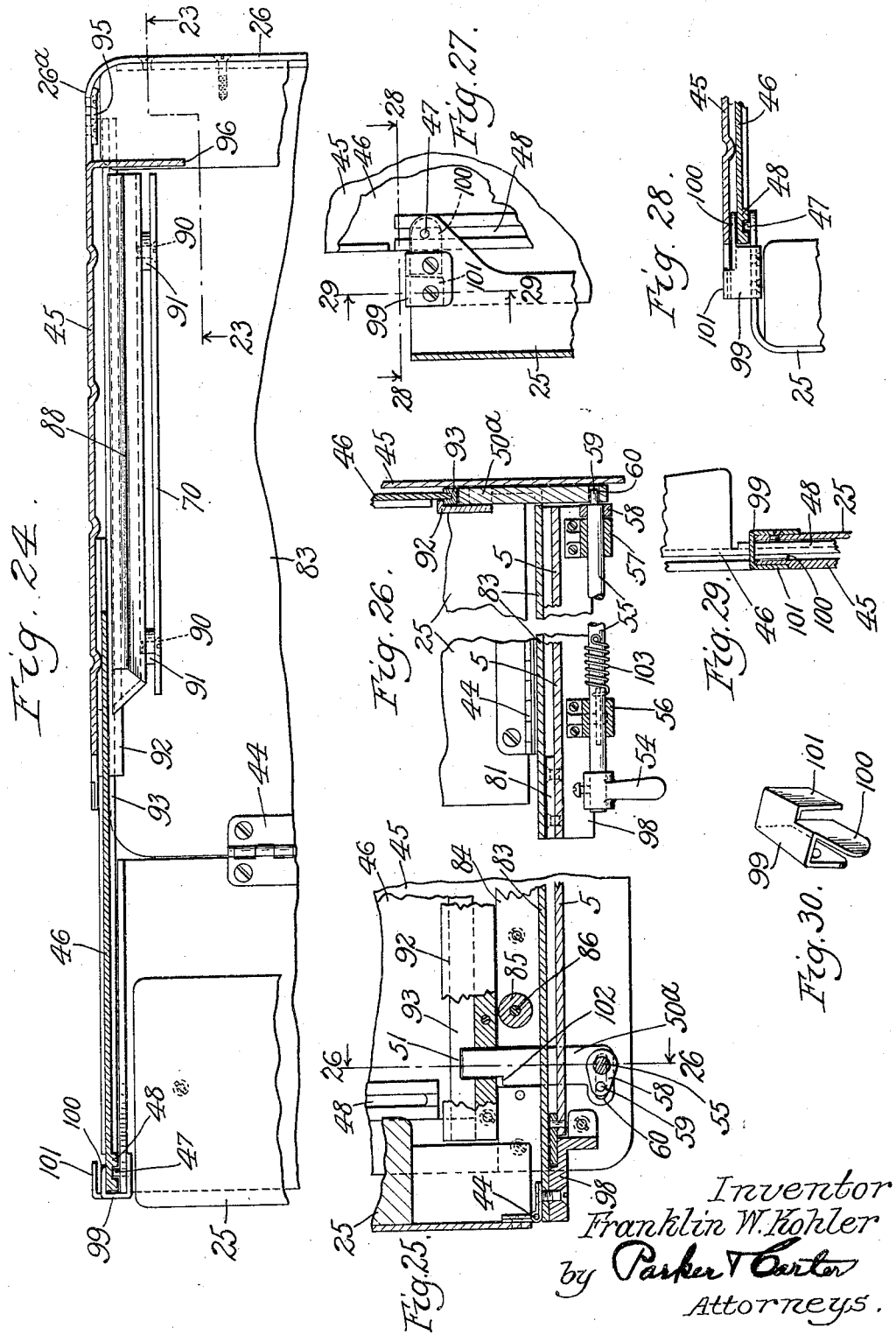

Patented Sept. 20, 1932

1,877,895

UNITED STATES PATENT OFFICE

FRANKLIN W. KOHLER, OF CHICAGO, ILLINOIS

CHAIR CONSTRUCTION

Application filed July 28, 1927. Serial No. 209,051.

This invention relates to improvements in chairs and has for its object to provide a new and improved device of this description. The invention has as a further object to provide a chair adapted for use in connection with parlor and sleeping cars.

The invention has as a further object to provide a chair which can be used in the day time as a chair and by means of combining two chairs, a sleeping berth can be provided. The invention has as a further object to provide a chair to be used on cars of such a construction that the car with these chairs can be used as a parlor car in the day time and as a sleeping car in the night time. The invention has other objects which are more particularly pointed out in the accompanying drawings.

Referring now to the drawings:

Fig. 1 is a perspective view of the interior of a car provided with one form of chair, embodying the invention and arranged to form berths for sleeping purposes.

Fig. 2 is a section on line 2—2 of Fig. 1.
Fig. 3 is a section on line 3—3 of Fig. 2.
Fig. 4 is a plan view of two chairs opened and converted into a bed.
Fig. 5 is a front view of a chair in open position.
Fig. 6 is a front view of a chair closed.
Fig. 7 is a section on the line 7—7 of Fig. 6.
Fig. 8 is a top plan view of a chair closed.
Fig. 9 is a section on the line 9—9 of Fig. 6.
Fig. 10 is a section on the line 10—10 of Fig. 5.
Fig. 11 is a section on the line 11—11 of Fig. 5.
Fig. 12 is the rear view of a back cushion.
Fig. 13 is a section on the line 13—13 of Fig. 7. Chair closed.
Fig. 14 is a detail view of the locking shaft cam.
Fig. 15 is a bottom view of the seat cushion.
Fig. 16 is a section on the line 16—16 of Fig. 9.
Fig. 17 is a section on the line 17—17 of Fig. 16.
Fig. 18 is a perspective view of a detail.
Fig. 19 is a similar section to Fig. 7 of the back on a larger scale.

Figures 22, 23:
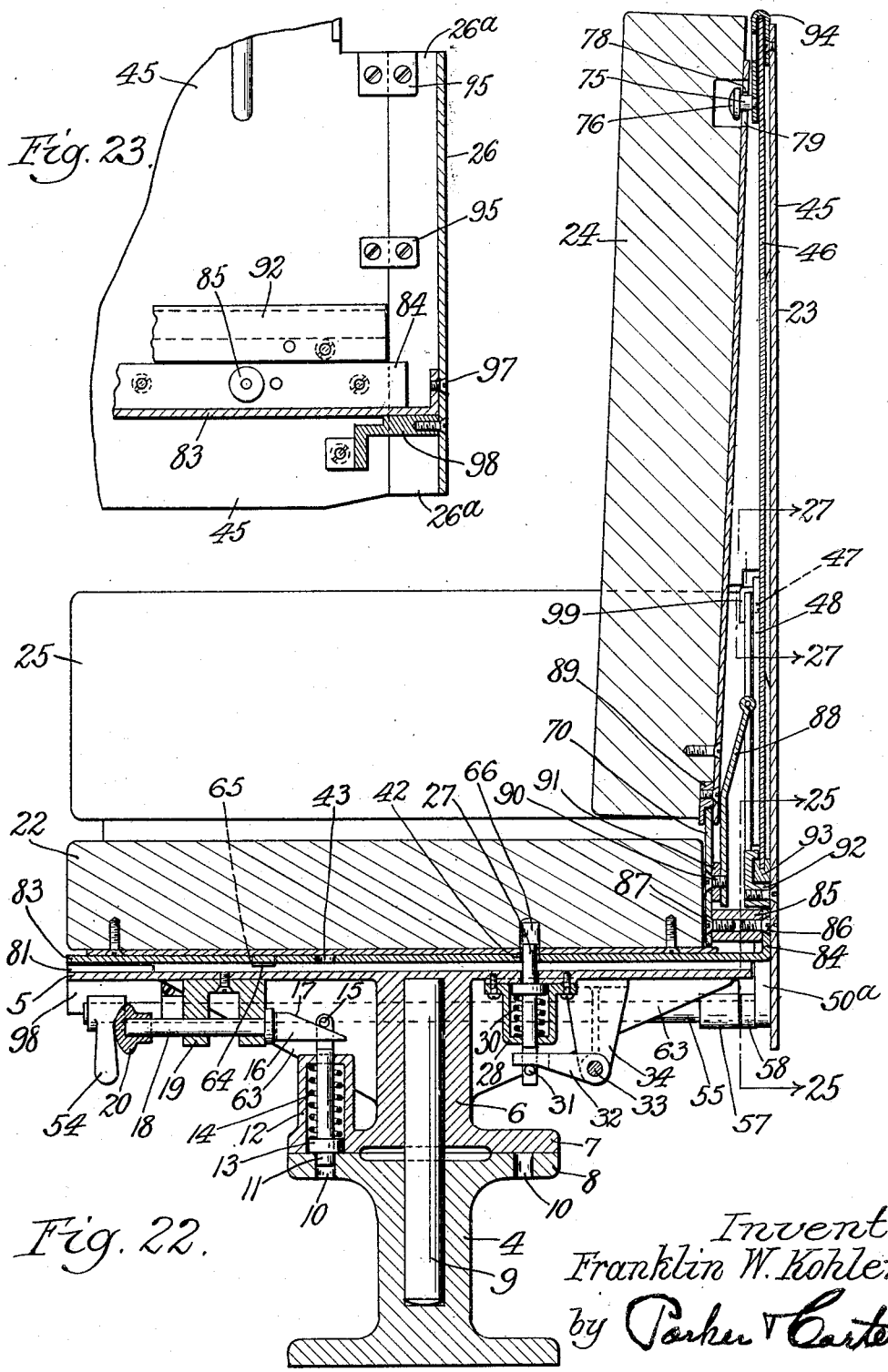

Fig. 20 is the front view of a modified form of a chair in open position.
Fig. 21 is the rear view of the modified form of chair.
Fig. 22 is a section on the line 22—22 of Fig. 21.
Fig. 23 is a section on the line 23—23 of Fig. 24.
Fig. 24 is a section on the line 24—24 of Fig. 20.
Fig. 25 is a section on the line 25—25 of Fig. 22.
Fig. 26 is a section on the line 26—26 of Fig. 25.
Fig. 27 is a section on the line 27—27 of Fig. 22.
Fig. 28 is a section on the line 28—28 of Fig. 27.
Fig. 29 is a section on the line 29—29 of Fig. 27.
Fig. 30 is a perspective view of a part.

Like numerals refer to like parts throughout the several figures.

Referring now to the drawings, I have shown in Fig. 1 a car 1 containing a plurality of chairs embodying the invention, the chairs being arranged to form sleeping berths. These chairs form the lower berth 2. The upper berth 3 may be constructed in the manner in which said berths are at present constructed so that they may be shut up and when in use will thus be out of the way. The chairs which are used as chairs or which may be made up into berths may be similar and may be supported in any desired manner.

For purposes of illustration, I have shown these chairs as being supported upon pedestals 4 fastened to the floor the upper part of the chair being rotatably mounted on the pedestal in any desired manner.

It is, of course, evident that the method of supporting the chair may be arranged to meet the conditions presented. The chairs are arranged so that they are like ordinary chairs when being used as chairs. When it is desired to make a berth, the two chairs are arranged facing each other, the seat portions of the chairs being slid back upon the bases. The inside arms of the chairs, that is, the arms nearest the wall of the vehicle are extended and the cushions at the backs of the chairs are taken out and placed between the chairs so as to fill the space between them, these cushions resting on portions of the bottoms of the bases of the chairs which are exposed when the bottoms of the chairs are slid back. A complete support is thereby formed for the mattress which is taken from the upper berth and placed on this support and the berth made up.

Referring now to the particular construction of the form of chair illustrated, such chair has a base 5, (see Figs. 7, 8, and 9), such base having a projecting part 6 provided with a laterally extending flange 7 which rests on the flange 8 of the pedestal 4. A connecting piece or shaft 9 projects into the connecting piece 6 and the pedestal 4 so as to make a strong connection between them which permits the rotation of the base upon the pedestal. The pedestal being fastened to the floor is stationary and the base is rotated thereon. Some means is provided for holding the base of the chair in any desired relationship with the pedestal. In the construction shown, this is accomplished by providing the pedestal with a series of openings 10 and providing the base of the chair with a pin 11 adapted to fit into any one of these holes so as to hold the base in any desired position.

In the construction shown, the flange 7 is provided with a cup 12 through which the pin 11 passes. This pin has a stop 13 thereon which limits its motion in one direction. A spring 14 in the cup 12 engages this stop and normally holds the pin in position in one of the holes 10. When it is desired to change the position of the base of the chair with relation to the pedestal, the pin is lifted to disengage it from the pedestal. Any suitable means may be used for this purpose. As herein shown, the pin 11 is provided with an engaging part 15 which is engaged by an actuating part 16. This actuating part is provided with a beveled edge 17 and is connected with a sliding rod 18 slidably mounted in a member 19 connected with the base of the chair. A handle 20 is connected with the sliding rod. When the sliding rod 18 is moved inwardly, the pin 11 is lifted to disengage it from the pedestal 4. The base of the chair may then be rotated to any desired position. When the rod 18 is released, the spring 14 will move the pin into one of the openings 10 which may be opposite to such pin and this fixes the base of the chair to the pedestal 4.

When the chair is being used as a chair, the bottom 21 is preferably centrally located over the pedestal 4. On the bottom is a seat cushion 22. The chair is provided with a back 23. The bottom and back, base and pedestal are preferably made of metal. A back cushion 24 is removably connected with the back.

The chair is provided at the sides with the arms 25 and 26. At least one of these arms is arranged to be moved to extend the bottom of the chair, that is, make the bottom wider.

In the construction herein shown, this is accomplished by having the arm 25 hinged so that it may be folded over as hereinafter explained. The chair is arranged so that the seat and the back may be slid rearwardly. The bottom is held in its forward position, that is, the position which it occupies when the device is used as a chair, by the holding piece 27 which projects into an opening in the bottom as shown in Fig. 9.

This holding piece is provided with a suitable releasing mechanism by means of which the holding piece is disconnected from the bottom when it is desired to slide the bottom with relation to the base.

In the construction shown, the holding piece 27 passes through the base 25 and projects through a cylinder 28 attached to the base. The holding piece has a stop 29 which limits its upward movement. Within the cylinder is a spring 30 which normally holds the holding piece in its locking position, that is in engagement with the bottom 21. The holding piece is provided with an engaging part 31 which is engaged by an arm 32 on a rod 33 mounted in brackets 34, 35 on the lower side of the base 5. It will be seen that by partially rotating or rocking this rod in one direction, the arm 32 will be moved downwardly so as to move the holding piece 27 out of engagement with the bottom 21. The rod 33 is rocked in any desired manner. As herein shown, it is connected to a shaft 36, (see Figs. 7 and 13) by means of an arm 37. The shaft 36 may be rotated and also moved longitudinally and extends to the front of the chair so that it is easily accessible. This shaft has at its front end a handle 38 and passes through a cam guide 39. This cam guide is provided with a cam face 40 and the shaft 36 is provided with a pin 41 which engages this cam face when the shaft is rotated. It will be seen, (see Fig. 13) that when the shaft 36 is rotated, the pin 41 will move along the cam face 40 thus moving the shaft 36 longitudinally to the left, that is, toward the front of the chair. This will rock the rod 33 so as to move the arm 32 to cause it to move the holding piece 27 to disengage it from the bottom 21. The bottom may then be moved backwardly. The handle may be released as soon as the opening 42 in the bottom has moved to one side of the holding piece 27. As the bottom is moved back, the hole 43 will come opposite the holding piece 27 and said holding piece will then be moved up into this hole by the spring 30 so as to hold the parts in their rearward position. The back of the chair is also widened. This widening of the back may be accomplished by various mechanisms. As herein shown, it is accomplished by means of the arm 25. This arm is pivotally connected to the bottom by one or more hinges 44. The back 23 of the chair has two overlapping sections 45, 46 which are adapted to be moved relatively to widen the back.

The arm 25 is connected with the section 46, (see Figs. 16 and 17). The arm 25 has connected therewith a pin 47 which works in a guide 48 on the section 46 of the back of the chair. This guide is provided with a stop 49 for said pin which prevents it from becoming disengaged from the guide, and when the device is used as a chair, the arm 25 is held in its upright position and the section 46 of the back held in its chair position by the locking piece 50 which engages a notch 51 in the section 46 of the back.

Some means is provided for releasing this locking piece. As herein shown, the locking piece 50 is connected with the chair by a fastening piece 52 and is provided with a slot 53 so that it may be moved with relation to this fastening piece so as to move it out of the notch 51 in the section 46 of the back.

The locking piece is moved by means of a handle 54 on the shaft 55 working in bearings 56 and 57. This shaft is provided with an arm 58 which is connected with the locking piece 50 by a pin 59 working in a slot 60 in said arm (see Fig. 16). The shaft 55 is provided with a retracting spring 61. When the shaft is rotated by the handle 54, the locking piece 50 is moved out of the notch 51 to the position shown in dotted lines in Fig. 16 and the arm 25 and section 46 of the back will then be moved to the position illustrated in Fig. 5. The section 46 of the back is provided with a second notch 62 into which the locking piece 50 is received when the section 46 is in its extended position as shown in Fig. 5. A retracting spring 61 normally holds this locking part in its locking position.

In the construction shown, the base 5 is provided on its lower side with a series of strengthening ribs 63. The seat cushion 22 is provided with some means for preventing it from accidentally sliding out of position on the bottom 21.

In the construction shown, this is secured by means of projections 64, (see Fig. 15) which fit into slots 65 in the bottom (see Fig. 8). When the arm 25 is moved about its hinges to widen the seat, the seat cushion may then be slid over to fill the space left open by the turning down of the arm. Normally the seat cushion 22 is under the arm 26 as shown in Fig. 6. When the arm 25 is straightened out to widen the seat as shown in Fig. 5, the seat cushion 22 is slid over against it as shown in said figure so as to fill up the space left vacant. This does not leave an unfilled bottom space at the other side, due to the fact that the seat cushion has been under the arm 26 and the distance left open by moving the arm 25 is substantially equal to the portion of the cushion which was under the arm 26, as shown in Fig. 6. When the seat cushion 22 is slid over as herein set out, the pins 64 slide along the slots 65, (see Fig. 11). The holding piece 27 as shown in Fig. 9 projects into a hole 66 in the seat cushion. When this construction is used, a similar hole 67, (see Fig. 15), must be provided so that when the seat cushion is slid over, the holding piece 27 will enter this hole. The seat cushion also has a hole 68 for the holding piece 27 when the bottom 21 is slid back, as shown in Fig. 10. The seat cushion is also provided at its rear end with a projecting part 69 which projects under the back cushion supporting piece 70, forming a part of the back of the chair. The back cushion 24 is provided at its bottom with a holding piece 71 which has a groove into which is received the supporting piece 70, (see Fig. 7). The back is provided with inclined guiding pieces 72—72 which guide the holding piece 71 into position so as to insure the supporting piece 70 entering the slot therein. This guiding piece 72 has a bent portion 73 which insures the supporting piece entering the groove in the holding piece 71. Some means is provided for holding the top of the back cushion in position. As herein shown, the back section 45 is provided with pieces 74 and 74a which act as guides for the back section 46 to permit it to be slid with relation to the back section 45 but prevent its outward movement away from the section 45.

Connected with this piece 74 is a pin 75 which has a head 76. The back cushion 24 has a plate 77 provided with a slot 78 having an enlarged portion 79, (see Fig. 12). The head 76 is inserted in the enlarged portion 79 of the slot and the back is moved under the pin through the narrower portion of the slot. This holds the top of the back against movement away from the back of the chair. This slot 78 is elongated so as to permit a sliding between the pin 75 and the back cushion. The back cushion is also provided with the locking openings 80. When the chairs are made into a berth, the back cushions of the chairs are used as the bottom of the berth and these locking openings fit over locking projections 81 on the base 5 of each chair. Each chair base has two of these locking projections 81 and one of the locking openings in one end of the back cushion receives one of the locking projections on one chair and one of the locking openings in the other end of the back cushion receives one of the locking projections on the opposite chair, (see Fig. 4). This holds the cushion in the space between the chairs at the outer edge of the berth, (see Fig. 4). The other back is placed near the wall and the other two locking projections 81 are received in two locking openings of this back cushion. These locking openings and projections hold the backs against accidental movement.

In the construction shown the base 5 is provided with guides 5a which slide in guideways formed by the angle members 5b connected with the bottom 21. (In Figs. 20 to 30, the bottom 83). When the chair is slid back the parts slide on the guides 5a since the base 5 remains stationary. A stop 5c is arranged on the bottom portion 20 and a stop 5d on the base 5 which are brought into engagement to limit this sliding motion. The back section 45 is provided with an eye 45a having a bolt 45b to lock the partition 107 in position. The arm 25 is provided with a fitting 25a near the pivot pin 47 which fitting slides along the back section 46 to hold the pivot pin 47 in its slot or guide 48.

The plate 21 is provided with a stop 21a which strikes a stop 21b on the base plate 5 to limit the backward movement of the chair. When the handle 38 is rotated so that pin 41 bears against cam face 40, both the cushion 22 and plate 21 are unlocked, the pin 27 being moved far enough to be removed from the holes in the cushion 22 and the plate 21. When the handle 38 is rotated so that pin 41 bears against cam face 40a, the pin 27 is only removed from the opening in the cushion. This permits the cushion to be slid laterally when the arm 25 is moved down so as to widen the chair to seat two people. The plate 21 remains locked so that the parts cannot be moved backward. When the chair is thus widened it can be used to seat two people.

In Figs. 20 to 30 I have shown a modified form of chair. In this construction, the bottom 83 is provided with the upwardly bent end 84, (see Fig. 22). The back cushion supporting piece 70 is connected with the upturned end 84, by the connecting piece 85 and the screws 86 and 87.

In this construction, which is the preferred construction, the cushions are preferably provided with metal backing plates the bottom cushion having the plate 22a and the back cushion having the plate 24a. The slots 78 and 79 and the opening 80 in this construction are in the back plate which extends over the entire area of the back cushion instead of in the small plate as shown in the construction heretofore described.

The guiding piece 88 which guides the grooved member 89 on the back cushion into engagement with the supporting piece 70 is connected with said supporting piece by the fastening device 90 and is spaced therefrom by the spacing block 91. The lower guide 92 for the section 46 of the back of the chair is attached to the section 45 and the section 46 is provided at its lower end with the enlargement 93, the guide being shaped to receive this enlargement. The upper guide 94 for the back section 46 consists of a member connected with the back section 45 and looped over the section 46, (see Fig. 22). The arm 26 has its rear end 26a bent, (see Figs. 21 and 24) and connected to the back section 45 is provided with the inwardly bent portion 96. The bottom 83 is connected with the arm 26 by the screw 97, (see Fig. 23) and also engages a bracket 98 connected with the arm and with the back section 45. The arm 25 is provided with a bracket 99, (see Figs. 26 to 30). This bracket is connected with the bent portion of the back carrying the pin 47 and is provided with a projecting part 100 which extends between the sections 45 and 46 of the back. It also has a member 101 which engages the back section 45 when the arm is folded, (see Figs. 28 and 29) so as to hold the arm against outward movement. The locking piece 50a which projects into the notch 51 passes through the bottom of the guide 92, (see Figs. 25 and 26) and enters a groove in the upturned end 84 of the bottom 83. This upturned end and the guide 92 hold the locking piece against lateral movement so that no pin is necessary. The upward movement of the locking piece is limited by the shoulder 102 which engages the guide 92. The retracting spring 103 for the rod 55 is located near the front end of said rod, as shown in Fig. 26.

When the chair is used as a chair, the arms are in their vertical positions and the two sections of the back are opposite each other, as shown in Figs. 6 and 21. When it is desired to make a berth with two of the chairs, the chairs are turned facing each other. The bottoms and backs of the chairs are slid rearwardly as shown in Fig. 4. The arms 25 are then lowered and the back sections 46 moved toward the wall of the car as shown in Figs. 4, 5, and 20. The edge of the arm 25 rests upon a support 104 on the wall 105 of the car. The back cushions 24 are then placed in position, having their ends supported upon the bases 5 of the opposed chairs. The inner back cushion 24 has its inner edge supported on the support 104 on the wall 105 of the car. The seat cushions are moved toward the wall until they close the gap formed by the turning down of the arms 25. It will, therefore, be seen, as shown in Fig. 4 that the entire bottom of the berth is provided with cushions.

The upper berth may be arranged in the usual way by means of the hinged support 106 which is moved about its hinge to a horizontal position when the berth is to be made up. The usual hinged partitions 107 are placed between the berths. These partitions are provided with the section 108 which is slid downwardly when the berth is made, as shown in full lines in Fig. 2 so as to fill the space between the arm 26 and the lower edge of the partition 107. This section 108 may be slid up into a recess in the partition, as shown in dotted lines in Fig. 2, and held in place by a pin 109 when not in use. The usual pillows, covers and the like may now be placed in the berth as is customary in the ordinary berths.

It will thus be seen that these chairs may be used as chairs in the daytime and may then be easily and quickly arranged to form berths at night and that the same car, therefore, may be used as a chair car and as a sleeper. This permits the same car to be used in the daytime as a chair car and then to be used that night as a sleeper, permitting the continuous use of each car, whether it is desired to use it as a sleeper or a chair car. This greatly reduces the number of cars necessary on any given line.

I claim:

1. A chair construction comprising a base, a bottom movably connected with said base, two arms connected with the bottom, a back comprising relatively movable sections, and means for moving one of said arms to widen the chair bottom and back, said bottom and back being movably connected to said base so that the bottom and back may be moved to permit the base to project beyond said bottom.

2. A chair construction comprising two chairs each having a base, a bottom movably connected with said base, two arms, a back comprising relatively movable sections, means for moving one of said arms to widen the chair bottom and back, said bottom and back being movably connected to said base so that the bottom and back may be moved to permit the base to project beyond said bottom, cushions connected with the backs of said chairs, said cushions adapted to be supported on the projecting portions of said bases, and seat cushions for said chairs, the seat cushions and back cushions substantially filling the space between the backs of the chairs so as to form a bed.

3. A chair construction comprising a bottom, a back having one section connected with said bottom, a second section for said back, slidably connected therewith, an arm pivoted to said bottom and movably connected with the slidable section of said back whereby the movement of the arm moves the sliding section of said back to extend the back, a locking part, two separated engaging devices on the sliding section of said back, one adapted to be engaged by the locking part when the sliding section is in one position and the other adapted to be engaged by said locking device when the sliding part is moved out to widen the back.

Signed at Chicago, county of Cook and State of Illinois, this 8th day of July, 1927.

FRANKLIN W. KOHLER.